United States Patent
Parsonnet et al.

(10) Patent No.: US 12,248,514 B1
(45) Date of Patent: Mar. 11, 2025

(54) APPARATUS, SYSTEM AND METHOD FOR DISPLAYING TIME-SERIES DATA

(71) Applicant: Seeq Corporation, Seattle, WA (US)

(72) Inventors: Brian Parsonnet, Fort Collins, CO (US); Alberto Rivas, Houston, TX (US)

(73) Assignee: Seeq Corporation, Seattle, WA (US)

( * ) Notice: Subject to any disclaimer, the term of this patent is extended or adjusted under 35 U.S.C. 154(b) by 0 days.

(21) Appl. No.: 17/890,028

(22) Filed: Aug. 17, 2022

Related U.S. Application Data

(60) Provisional application No. 63/234,878, filed on Aug. 19, 2021.

(51) Int. Cl.
| | |
|---|---|
| G06F 16/901 | (2019.01) |
| G05B 23/02 | (2006.01) |
| G06F 3/04847 | (2022.01) |

(52) U.S. Cl.
CPC ....... G06F 16/9024 (2019.01); G05B 23/024 (2013.01); G06F 3/04847 (2013.01); *G06F 2218/00* (2023.01)

(58) Field of Classification Search
CPC .................................................. G06F 16/9024
USPC ......................................................... 707/798
See application file for complete search history.

(56) References Cited

U.S. PATENT DOCUMENTS

| | | | |
|---|---|---|---|
| 6,426,756 B1 * | 7/2002 | Winget | G06T 15/04 |
| | | | 345/582 |
| 6,785,639 B2 * | 8/2004 | Shirai | G01D 1/18 |
| | | | 327/60 |
| 8,694,540 B1 * | 4/2014 | Lin | G06F 16/211 |
| | | | 707/777 |
| 2004/0021695 A1 * | 2/2004 | Sauermann | G06F 3/04847 |
| | | | 715/786 |
| 2004/0257475 A1 * | 12/2004 | Kim | G06T 3/4007 |
| | | | 348/581 |
| 2014/0028911 A1 * | 1/2014 | Knee | H04N 7/0127 |
| | | | 348/452 |
| 2015/0019687 A1 * | 1/2015 | Aaron | H04L 67/12 |
| | | | 709/219 |
| 2018/0033169 A1 * | 2/2018 | de Waele | G06T 11/60 |
| 2021/0248134 A1 * | 8/2021 | Duffield | G06F 16/26 |

\* cited by examiner

*Primary Examiner* — Muluemebet Gurmu
(74) *Attorney, Agent, or Firm* — Polsinelli PC; Derek D. Donahoe

(57) ABSTRACT

A method that incorporates a "detail level" setting by means of a slider bar, which may be presented in a graphical user interface, that can used to choose a display level of data to display. At one extreme, the system generates a data display of minimum and maximum values for a set of data of time-series data set being displayed. At the other extreme, the system provides a single "average." However, between the extremes, the system displays a representation of sets of data that smoothly transitions between the two extremes and in effect combines the averaging function with the minimum and maximum functions to provide a unique representation of a set of data.

18 Claims, 8 Drawing Sheets

APPARATUS, SYSTEM AND METHOD FOR DISPLAYING TIME-SERIES DATA

CROSS-REFERENCE TO RELATED APPLICATION

This application is related to and claims priority under 35 U.S.C. § 119 from U.S. Provisional Application No. 63/234,878 filed Aug. 19, 2021 entitled "Apparatus, System and Method for Displaying Time-Series Data," the entire contents of which are fully incorporated by reference herein for all purposes.

TECHNICAL FIELD

Aspects of the present disclosure involve a method of displaying time-series data to optimally display the data with revealing information, and provide user detail control, particularly when the available display space (e.g., pixel resolution) is less than the number of data points to visually represent.

BACKGROUND AND INTRODUCTION

Displays are limited in the level of detail that may be shown by the pixel resolution of the display. Such resolution and pixel limitations pose issues when trending time-series and other forms of data sequences. In the example of time-series data, it may be the case that the time-series data and related trend lines commonly have more sample points across a timeline (x-axis) than that can be precisely depicted given the pixel limitations. For example, if time-series data is recorded each second, there may simply be far more data values than available along the display's x-axis to display a discrete pixel illumination for each data value. Accordingly, conventional systems typically divide the number of samples by the available pixel width to define sets and display a representative value or values for each of the sets of data values. Conventionally, systems either display an average value of a given set or display the maximum and minimum values for the sets.

Imagine N samples to be plotted, with the constraint of having only B x-axis buckets, or lanes, each P pixels wide, and where P is nominally 1. The lane may have D dots but given that the width of the lane is 1 pixel in this example, multiple connected representative dots in that one lane will show as a vertical line. If the adjacent lanes also have vertical lines, there is no pixel room for a visual "connection" between the adjacent lanes. In such circumstances, the only characteristic of a given lane's D dots is the location of the maximum and minimum value dots.

There are situations when the user would like to see the actual minimum and maximum values. However, there are instances, especially when there is noise in the data, when displaying the maximum and minimum values skews one's perception out of proportion to the base signal's characteristics. In such instances, a single value might be a better representation of the actual data.

Since there are instances when the minimum/maximum representation is better in some instances and average is better in some instances, what is needed is for the user to make these choices based on his/her needs.

It is with these observations in mind, among others, that various aspects of the present disclosure were conceived.

SUMMARY

Disclosed is a method that incorporates a "detail level" setting by means of a slider bar, presented in a graphical user interface, that can be leveraged by the user to choose the data that he/she wishes to display and the data that he/she wishes to exclude from the visuals. At one extreme, the system generates a display that is identical to a "spike catching" technique where the minimum and maximum values are displayed for any set of data values of the overall time-series data set being displayed. The minimum and maximum data values represent real data points of a set of data values. At the other extreme, the system provides a single "average" for the set of data values. While various examples discussed herein refer to an average, the term and techniques discussed herein may also refer to and work with a median, weighted average, mean and other statistical average-like determinations. However, between the extremes, the system displays a representation of sets of data that smoothly transitions between the two extremes and in effect combines the averaging function with the minimum and maximum functions to provide a unique representation of a set of data. By way of a graphical user interface, such as a slider bar, the user may display the time-series data as averages of sets of the data, minimum and maximum values of the sets of data, or some combination of the two along a continuum between the extremes.

According to at least one example, a method includes: identifying, with a processor, an average value of a set of data values; generating, with the processor, a first linear interpolation between the average value and a maximum value of the set of data values; generating, with the processor, a second linear interpolation between the average value and a minimum value of the set of data values; generating, with the processor, a display of at least one point representative of a first location on the first linear interpolation and a second location on the second linear interpolation, the at least one point associated with a display level along a continuum between the average value and a combination of the minimum value and the maximum value.

The method may be implemented with a processor accessing computer executable instructions from a memory configured to store data, including programming instructions to run the method as well as time-series or other data that the method operates on. The time-series data may be accessed from the same or different storage as the instructions. The method also drives a display of the data, with the display being controlled by the processor or otherwise controlled more generally by the method.

According to at another example, a method includes: identifying, with a processor, an average value of a set of data values; segregating and sorting the set of data values into a first set of data values above the average value and a second set of data values below the average value; receiving an input for displaying a representation of the sequence of data values, the input defining a display level along a continuum between the average value and a combination of a minimum value and a maximum value; identifying, from the first set of data values, a first nearest value and a second nearest value associated with the input; identifying, from the second set of data values, a third nearest value and a fourth nearest value associated with the input; generating a first data point based on a first linear interpolation between the first nearest value and the second nearest value; generating a second data point based on a second linear interpolation between the third nearest value and the fourth nearest value; generating a display of at least one data point between the first data point and the second data point.

In another example, a method of displaying time-series data comprises, identifying, with a processor, an average value of a set of data values. The method further involves generating, with the processor, a first interpolation between the average value and a maximum value of the set of data values and generating, with the processor, a second interpolation between the average value and a minimum value of the set of data values. The method further involves generating, with the processor, a display of at least one point representative of a first location on the first interpolation and a second location on the second interpolation, the at least one point associated with a display level along a continuum between the average value and a combination of the minimum value and the maximum value. The first and second interpolations may be linear or non-linear.

These and other aspects of the present disclosure are described further in the detailed description that follows.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Aspects of the present disclosure involve systems and methods that provide a user with the option to choose the level of detail in the display of time-series data by way of a slider bar presented in a graphical user interface, or through other possible input mechanisms. In the example of a slider bar, at one end of the slider bar, the system displays a single point (the average) for a given collection (or set) of data values of the overall data values of the time-series data set the user wishes to view and at the other end of the slider bar, the system displays the extrema (e.g., maximum and minimum values although other representations of the extrema are possible) values of the collection of data values. In a simple example, if there are 10,000 data values and only 1000 pixels, the time-series data set of 10,000 values is divided into a sequence of 1000 buckets (sets) each with 10 data values. The system, via the techniques discussed herein, displays a representation of each of the buckets (sets) and the methods discussed herein refer to how each bucket or set of data is processed. The system may display the representations of each bucket sequentially to represent the total number of data values to be viewed.

In various examples, the system involves a processor, such as a CPU, GPU, and the like that accesses some form of data storage where time-series data is stored. The time-series data may be historical data. The time-series data may also be from a real-time stream to the system and stored immediately prior to generation of a display of the data in accordance with aspects of the present disclosure. The system also accesses and runs computer executable instructions in accordance with the methods disclosed herein to drive display of the time-series data.

In a first example, a method involves providing for the display of a linear transition between extrema of the data set (e.g., minimum and maximum values of a given time-series data set) and an average of the values of the data set. In another example, a method involves providing for the display a non-linear transition between extrema and average of the data sets.

Figure 1:
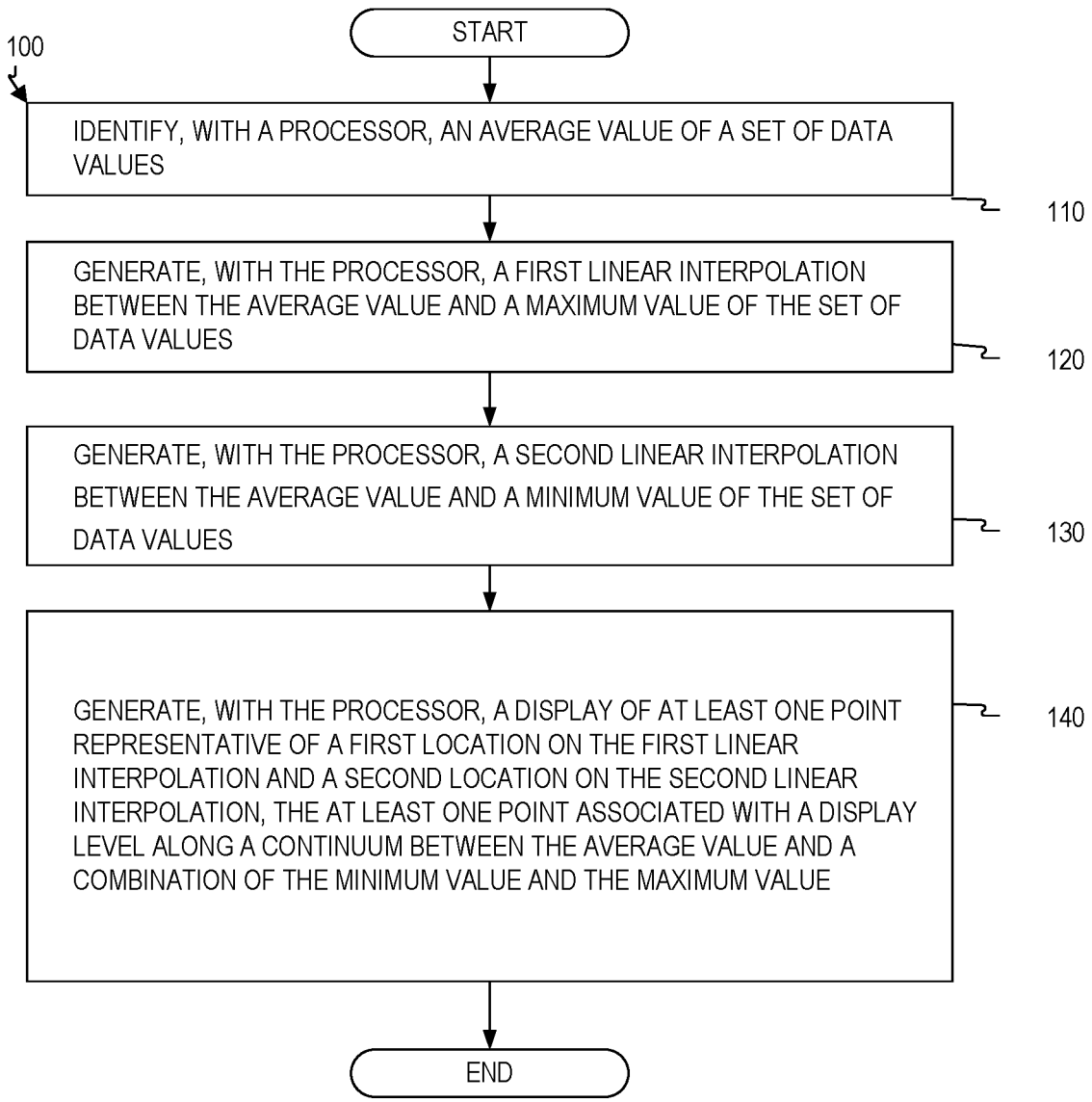
FIG. 1 is a flowchart of a method for displaying data, such as time-series data, according to an example of the instant disclosure and in relation to the method of FIG. 2.
Figure 2:
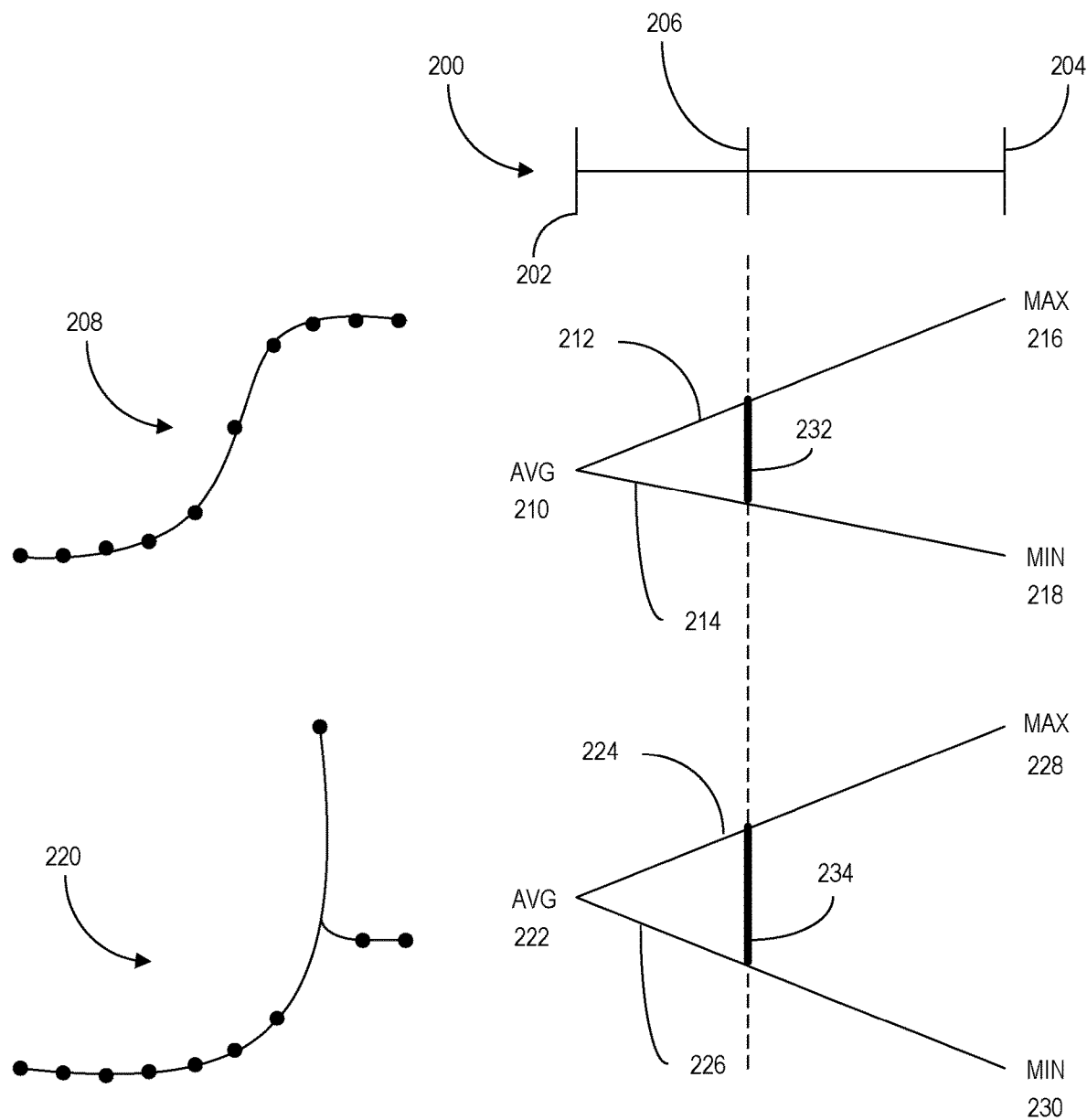
FIG. 2 is a diagram depicting a first example and a second example of time-series data and a respective first example and second example of a generated display of a representation of the time-series according to examples of the instant disclosure.

Beginning with the first example and with reference to FIGS. 1 and 2, the method involves and provides several display attributes. First, the displayed data per data bucket (set) involves two points (vertically aligned) other than when representing the average. At the highest "detail level" setting the method provides a "spike catching" technique (including min/max/enter/exit) for a given set of data points and displays the maximum and minimum values of the set (points represent real data points) and a vertical line therebetween. Conversely, at the lowest "detail level" setting, the method reduces to a display of a single "average" point (which may or may not be a real point) for a given set of data points. Any other setting of the "detail level" in between the extremes (the highest and lowest detail levels) determines the output representation of the set of data (two vertical aligned points, which may further have a line therebetween) with a linear transition between the average point and the respective extrema (min and max) of the data set.

The method may begin with preprocessing of the data to divide or otherwise collapse the overall time-series data intended to be displayed into discrete buckets for further processing. Referring again to the example of 10,000 discrete data points, the system generates 1000 buckets (sets) with each set having 10 data values. For time series data, the data values in a set are sequential. The techniques here may work with other arrangements of data, not only time-series.

After preprocessing, referring to FIG. 1, the first method involves calculating the average for each set of data values (operation 110). The system then generates, for each set of data values, a first linear interpolation between the average value and the maximum value for the data set (operation 120) and a second linear interpolation between the average value and the minimum value of the data set (operations 130).

To generally illustrate the technique, the system further receives an input defining the display attributes for the data. Referring to FIG. 2, in the example of a slider bar 200 presented in a graphical user interface, one end 202 of the slider bar may be associated with displaying the average values of the data sets and the other end 204 of the slider bar may be associated with displaying the extrema's of the data sets (e.g., minimum and maximum values of any given data set). Location 206 on the slider bar between the ends cause a display based on the linear interpolations from operations 120 and 130. Referring to FIG. 2, a first set of data values 208 results in an average value 210 along with two respective linear interpolations 212 and 214 between the average value and the maximum value 216 and between the average value and the minimum value 218 for the data set 208. Similarly, a second set of data values 220 results in an average value 222 along with two respective linear interpolations 224 and 226 between the average value and the maximum value 228 and between the average value and the minimum value 230 for the data set 220. Overall, depending on how the user selected slider bar is manipulated, the system displays a value between the average, and a representation of the computed minimum and maximum values at locations along the respective interpolations, or a representation of the extrema of each given data set. Referring to FIG. 2, where the slider bar is positioned 206, the method generates respective vertical lines 232 and 234 between the respective linear interpolations 212,214 and 224,226 for the respective data sets. As such, each data set 208 and 220 is represented by the respective vertical lines 232 and 234 between the respective interpolations.

To further illustrate the method of FIG. 1, consider after preprocessing, one hypothetical data set involving 32 discrete data values in the following Table 1 that is fitted to be displayed in a pixel limited display.

TABLE 1

| | Data Points to be fitted in 1 pixel |
|---|---|
| | 65.15 |
| | 66.55 |
| | 68.96 |
| | 72.32 |
| | 76.28 |
| | 80.40 |
| | 84.16 |
| | 87.49 |
| | 90.54 |
| | 93.37 |
| | 96.03 |
| | 97.76 |
| | 97.14 |
| | 94.03 |
| | 89.49 |
| | 84.52 |
| | 80.06 |
| | 76.79 |
| | 74.14 |
| | 71.54 |
| | 69.50 |
| | 68.00 |
| | 66.85 |
| | 68.00 |
| | 66.85 |
| | 68.00 |
| | 66.85 |
| | 68.00 |

TABLE 1-continued

| | Data Points to be fitted in 1 pixel |
|---|---|
| | 66.85 |
| | 69.50 |
| | 68.00 |
| | 66.85 |
| Average | 76.87 |
| Minimum | 65.15 |
| Maximum | 97.76 |

Figure 3A:
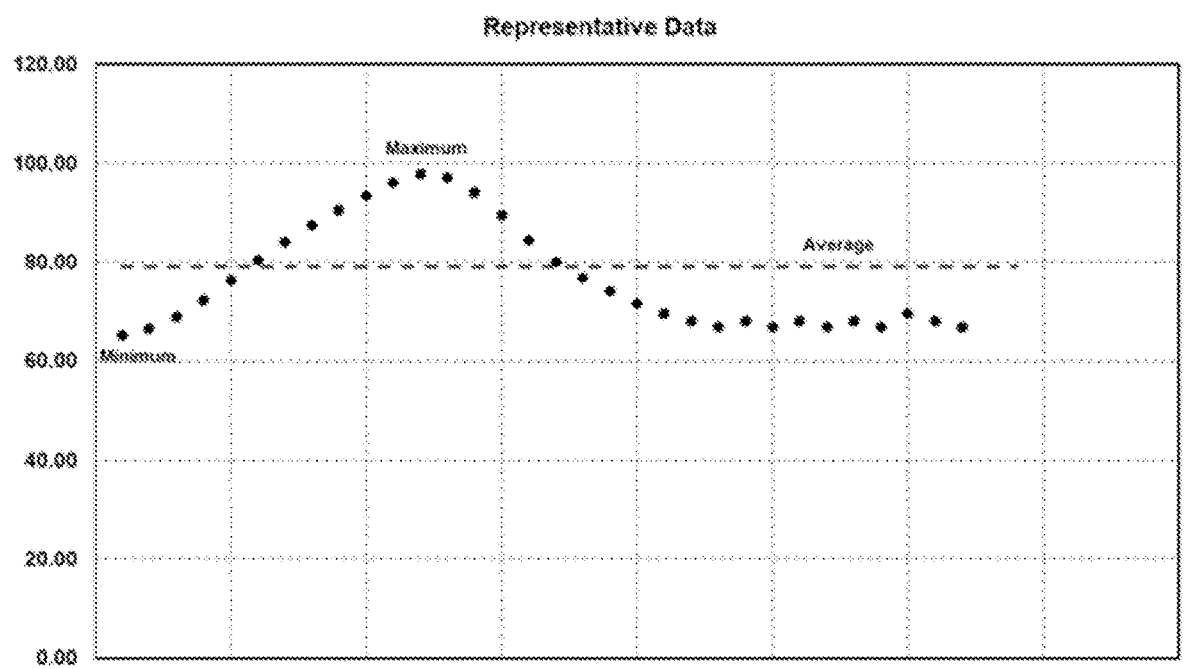
FIG. 3A is a graphical depiction of the data of Table 1.

This data set of Table 1 is represented graphically in FIG. 3A. Referring again to the operations of the first method, but now referring to the example values of the above Table 1:

Operation 110: The system calculate the average of the data set (76.87 in this example)

Operations 120 and 130: The system generates linear interpolations between the:

a. average value (76.87) and maximum value (97.76)

b. average value (76.87) and minimum value (65.15)

Operation 140: Depending on where the user selected point is on the slider bar, the system displays the average (one end of the slider bar), the minimum and maximum values discretely or with a vertical line therebetween (the other end of the slider bar) or discrete values along the respective interpolations curves, which may include a vertical line therebetween. It should be recognized that the system does not display the respective interpolations, these are only provided in the figures to illustrate the methods.

Figure 3B:
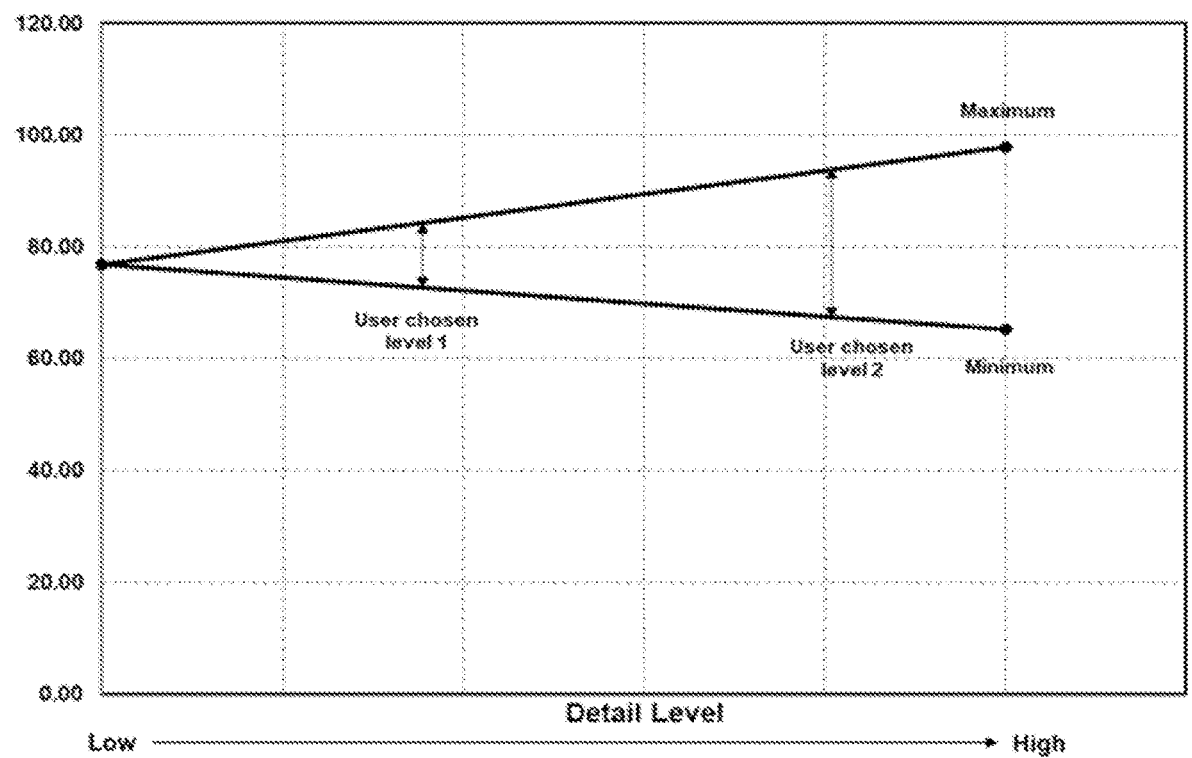
FIG. 3B is a graphical depiction of processing the data of FIG. 3A pursuant to the method of FIG. 1.

Let us consider an instance when the user choses a lower level of detail (relatively toward the average but not at the average) as is shown at level 1 in FIG. 3B. The values displayed will be closer to the average and the displayed values or vertical line between values will be based on the interpolations calculated in operations 120 and 130. Similarly, if the user chooses to have a relatively higher level of detail as shown at level 2, the values (extrema of the vertical line between the interpolations) displayed will be closer to the real extrema (maximum and minimum of the data set). As noted, if the user decides to display the lowest level of detail (e.g., with the slider bar to the left or otherwise at an end associated with the average), the system will display the average value to represent the data set.

FIG. 1, as introduced above, illustrates an example of the first method 100 for displaying data, particularly time-series data but other forms of data sequences may also be displayed using the technique. The system is particularly beneficial when the number of pixel values for a display does not allow for a direct representation of all data values. Although the example method 100 depicts a particular sequence of operations, the sequence may be altered without departing from the scope of the present disclosure. For example, some of the operations depicted may be performed in parallel or in a different sequence that does not materially affect the function of the method 100. In other examples, different components of an example device or system that implements the method 100 may perform functions at substantially the same time or in a specific sequence.

According to some examples, the method includes identifying, with a processor, an average value of a set of data values at operation 110. In some examples, the set of data values is a part of a larger set of data values, the larger set of data values being divided into a plurality of sets of data values, which include the set of data values, each of the plurality of sets of data values processed according to the method. In some examples, the average value is a mean value, a median value or an average value.

According to some examples, the method includes generating, with the processor, a first linear interpolation between the average value and a maximum value of the set of data values at operation 120. The method further includes generating, with the processor, a second linear interpolation between the average value and a minimum value of the set of data values at operation 130. According to some examples, the method then includes generating, with the processor, a display of at least one point representative of a first location on the first linear interpolation and a second location on the second linear interpolation, the at least one point associated with a display level along a continuum between the average value and a combination of the minimum value and the maximum value at operation 140. In some examples, the first location and the second location are the same and thereby the at least one point is the average value when the input defines a display level at a first end of the continuum, or the first location is the maximum value and the second location is the minimum value thereby the at least one point includes a first point for the maximum value and a second point for the minimum value at a second end of the continuum.

In various examples, the display is driven by a user selected display level. In some cases, however, the display may be generated in systems not relying a user driven input. In the case of a user driven input, the input defines the display level along a continuum between the average value and a combination of the minimum value and the maximum value. In a specific implementation, the system generates a slider bar presented in a graphical user interface, where the slider bar defines the continuum between the average value and the combination of the minimum value and the maximum. A user, through a mouse, touch screen or other user interface, interacts with the slider bar to set the display level along the continuum.

Considering a scenario where the data has outliers or extremely noisy values, the first method might not be suitable as the average is offset and is not representative of the real average of the data in consideration and the extrema are wider than they really are. Depending on the magnitude of the outlier, the extrema and the average might not represent the actual data at all. Accordingly, a second method may be considered as follows.

Figure 4A:
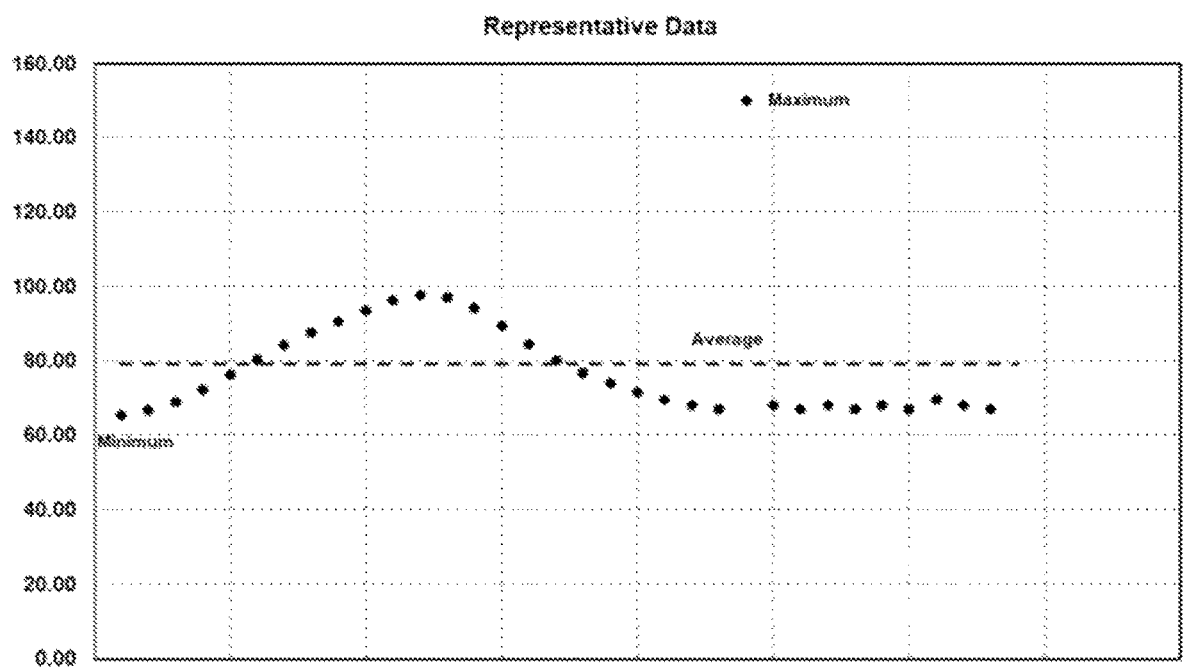
FIG. 4A is a graphical depiction of the data of Table 2, including an outlier.
Figure 4B:
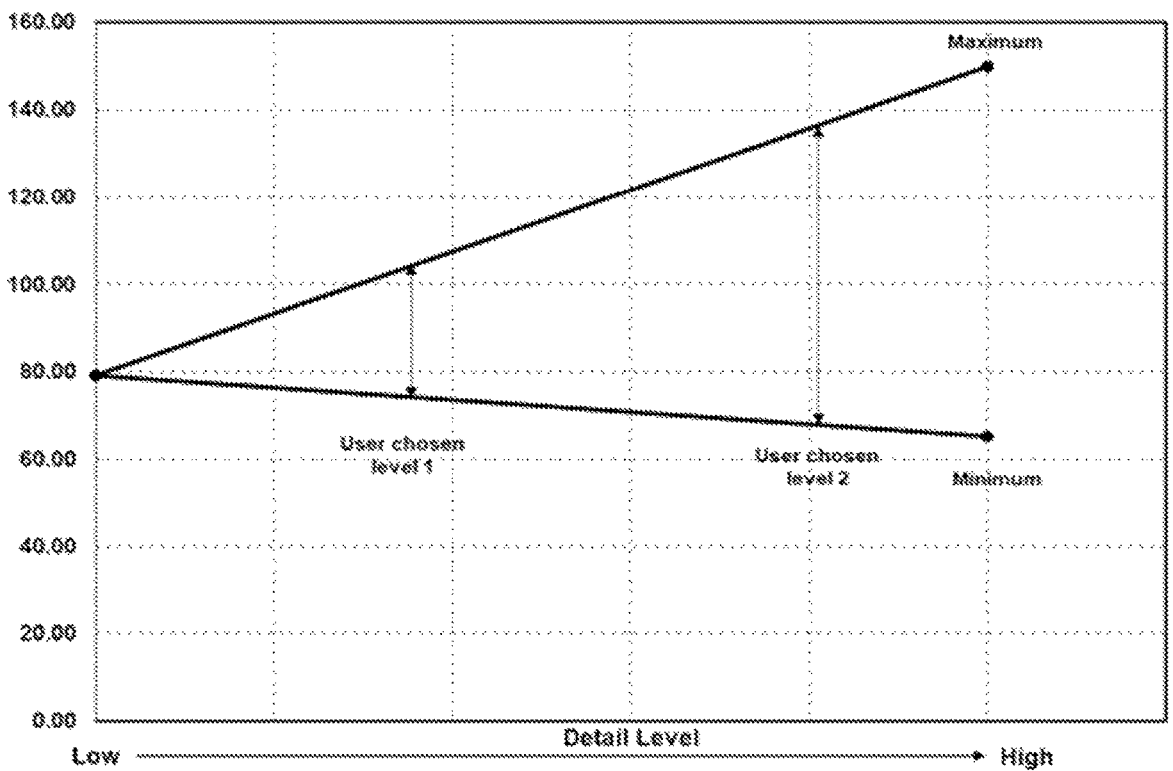
FIG. 4B is a graphical depiction of processing the data of FIG. 4A pursuant to the method of FIG. 1.

The scenario is explained with hypothetical data as before. Consider the data as below in Table 2, which is graphically depicted in FIG. 4A and which is the same as data before except it includes an outlier (150).

TABLE 2

| Data Points to be fitted in 1 pixel |
| --- |
| 65.15 |
| 66.55 |
| 68.96 |
| 72.32 |
| 76.28 |
| 80.40 |
| 84.16 |
| 87.49 |
| 90.54 |
| 93.37 |
| 96.03 |
| 97.76 |
| 97.14 |
| 94.03 |

TABLE 2-continued

| Data Points to be fitted in 1 pixel | |
| --- | --- |
| | 89.49 |
| | 84.52 |
| | 80.06 |
| | 76.79 |
| | 74.14 |
| | 71.54 |
| | 69.50 |
| | 68.00 |
| | 66.85 |
| | 150.00 |
| | 68.00 |
| | 66.85 |
| | 68.00 |
| | 66.85 |
| | 68.00 |
| | 66.85 |
| | 69.50 |
| | 68.00 |
| | 66.85 |
| Average | 79.09 |
| Minimum | 65.15 |
| Maximum | 150.00 |

The presence of the outlier shifts the average to 79.09 which is higher than the actual average (76.87) and makes the extrema wider (160 and 65.15) when compared to the original extrema (Table 1, FIG. 3A) without outliers (97.76 and 65.15). The user chosen level 1 and user chosen level 2 are the same level of detail as before. Even if the user chooses a low level of detail as in user chosen level 1, the maximum value displayed (~105) in this case is still not representative of the actual extrema (97.76) without the outlier and the maximum value displayed will be further skewed towards the outlier as the user choses a higher level of detail (as shown in user chosen level 2). In scenarios like this, aspects of the disclosure propose the use of the second method which makes use of non-linear transitions between the average and the extrema. The second method may be used in all cases, as may the second recognizing the second may have some limitations. Alternatively, the system may use the first method and use the second method when it identifies an outlier. Various techniques may be used to identify an outlier including setting some percentage threshold away from the average, a standard deviation from the average, etc.

Figure 5:
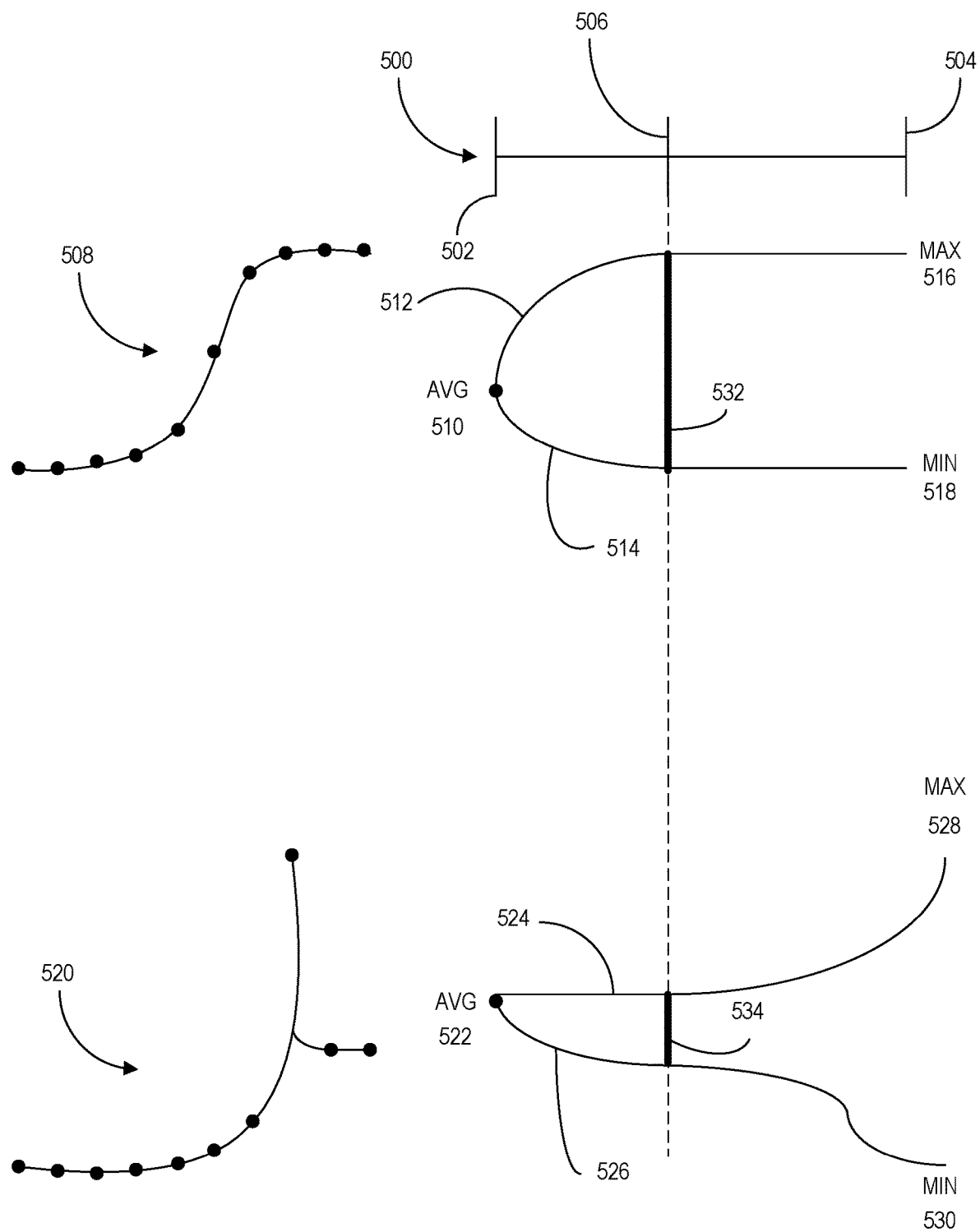
FIG. 5 is a diagram depicting a first example and a second example of time-series data and a respective first example and second example of a generated display of a representation of the time-series according to examples of the instant disclosure and in relation to the method of FIG. 6.

The second method will now be described in more detail with reference to FIGS. 5 and 6. The second method generally involves several attributes. First, like the first method, the displayed data per lane (or per data set) may be represented by an average of the data set or may be represented by two points (vertically aligned, which may include a vertical bar therebetween) at the minimum and maximum. At the highest "detail level" setting, the behavior is akin to a "spike catching" technique displaying the real maximum and real minimum. Conversely, at the lowest "detail level" setting, the second method, like the first, reduces the two points to a single "average" point (which may or may not be a real point) representative of the data set.

The second method differs from the first in how a data set is graphically depicted between the high and low detail settings (or, e.g., inputs by way of a slider bar). Any other setting of the "detail level" in between the extremes determines the output representation of the data (two vertical points) with a nonlinear transition, in contrast to linear interpolations of the first method, between the average point and the extrema (min and max) of the data in one lane (of one data set of the overall time series data to be graphically depicted). Specifically, per data set, the samples above the average point and below the average point are treated as two subgroups which are each sorted and mapped to the "detail level" setting—e.g., where the user has set the slider between the ends.

To generally illustrate the technique of the second method, the system receives an input defining the display attributes for the data. Referring to FIG. 5, in the example of a slider bar 500 presented in a graphical user interface, one end 502 (e.g., a low detail level end) of the slider bar may be associated with displaying the average values of the data sets and the other end 504 (e.g., a high detail end) of the slider bar may be associated with displaying the extrema's of the data sets (e.g., minimum and maximum values of any given data set). Location 506 on the slider bar between the ends cause a display based on the non-linear interpolations, discussed in more detail below. Referring to FIG. 5, a first set of data values 508 results in an average value 510 along with two respective non-linear interpolations 512 and 514 between the average value and the maximum value 516 and between the average value and the minimum value 518 for the data set 508. Similarly, a second set of data values 520 results in an average value 522 along with two respective non-linear interpolations 524 and 526 between the average value and the maximum value 528 and between the average value and the minimum value 530 for the data set 520. The data sets of FIG. 2 and FIG. 5 are the same making it possible to compare how the display is affected by the linear versus non-linear methods. Overall, depending on how the user selected slider bar is manipulated, the system displays a value between the average, and a representation of the computed minimum and maximum values at locations along the respective non-linear interpolations, or a representation of the extrema of each given data set. Referring to FIG. 5, where the slider bar is positioned 506, the method generates respective vertical lines 532 and 534 between the respective non-linear interpolations 512,514 and 524,526 for the respective data sets. As such, each data set 508 and 520 is represented by the respective vertical lines 532 and 534 between the respective interpolations.

Figure 6:
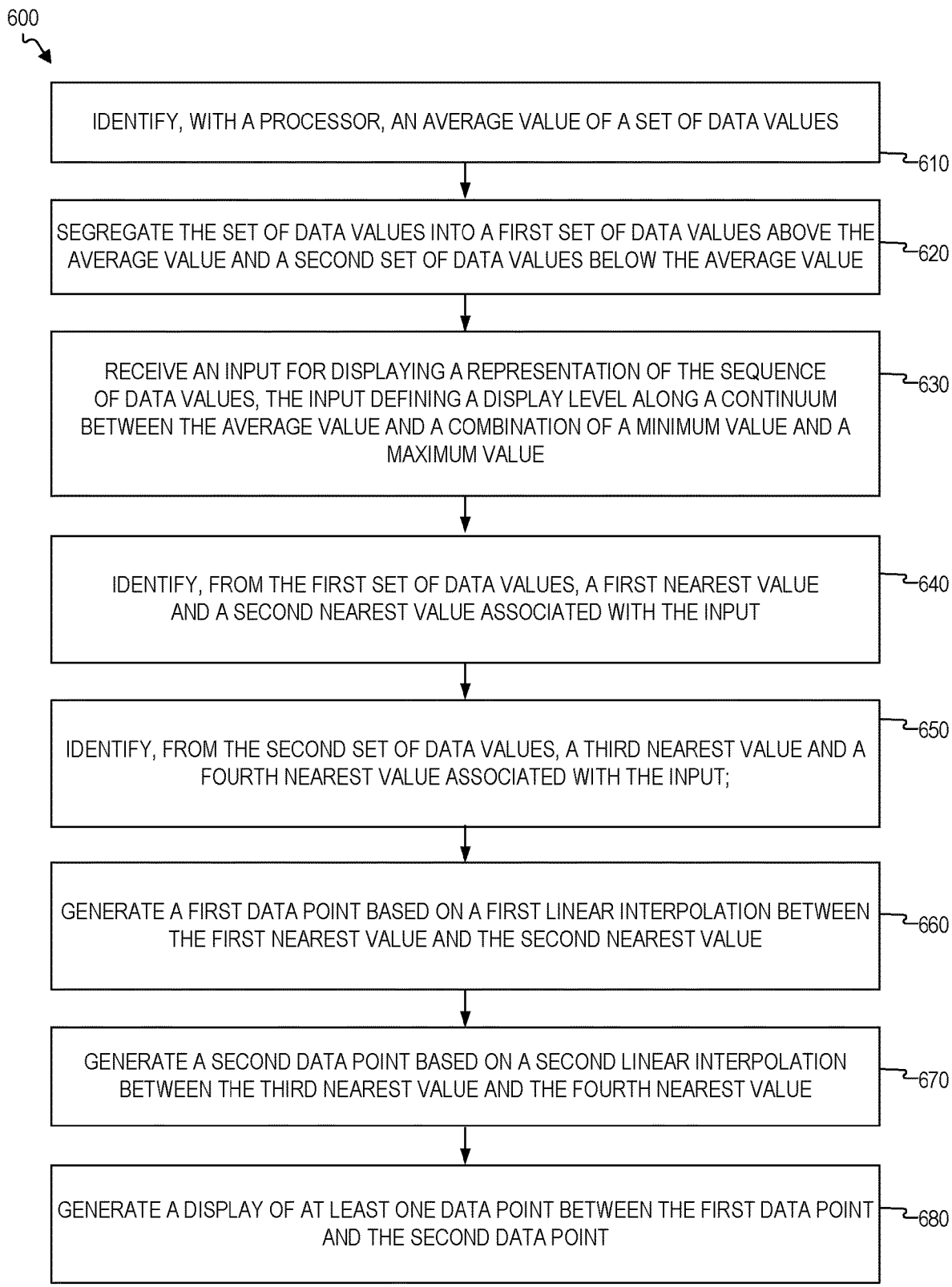
FIG. 6 is a flowchart of an alternative method for displaying data, such as time-series data, according to an example of the instant disclosure.

More particularly, referring to FIG. 6, the second method (600) involves calculating an average for a given data set (operation 610). Like the first method, the system may first preprocess any given series of time-series data based on the screen resolution or otherwise, e.g., like the 10,000 data value subdivision into 1000 buckets (sets) of 10 values discussed above.

The method of FIG. 6 also divides the data points into two groups: One group will include data points above the average and one group will include data points below the average. Therefore, the curves that goes from the average to the respective extrema are represented by how far off each real data point is from the average in the respective groups.

In operations 640-650, the system sorts the data points in these two groups-going from average to both extremes. In operations 660-680, the systems calculates the display extrema based on the user selected level of detail. Overall, each non-linear interpolation of each sub group of data involves linear interpolation. More particularly, this is done by linear interpolation between the sorted values. Depending on the level of detail, the technique considers one closest real data point on one side of the slider location (e.g., to the left of the slider (506)) and one closest real data point to the other side of the slider location (e.g., to the right of the slider 506)) in both the groups and performs linear interpolation between those two points to obtain the minima (from the data points below the average) and maxima (from the data points above the average) to be displayed. In this way, the displayed representation of the actual range will be biased towards the data values that are more frequent either above or below the average point.

Figure 7:
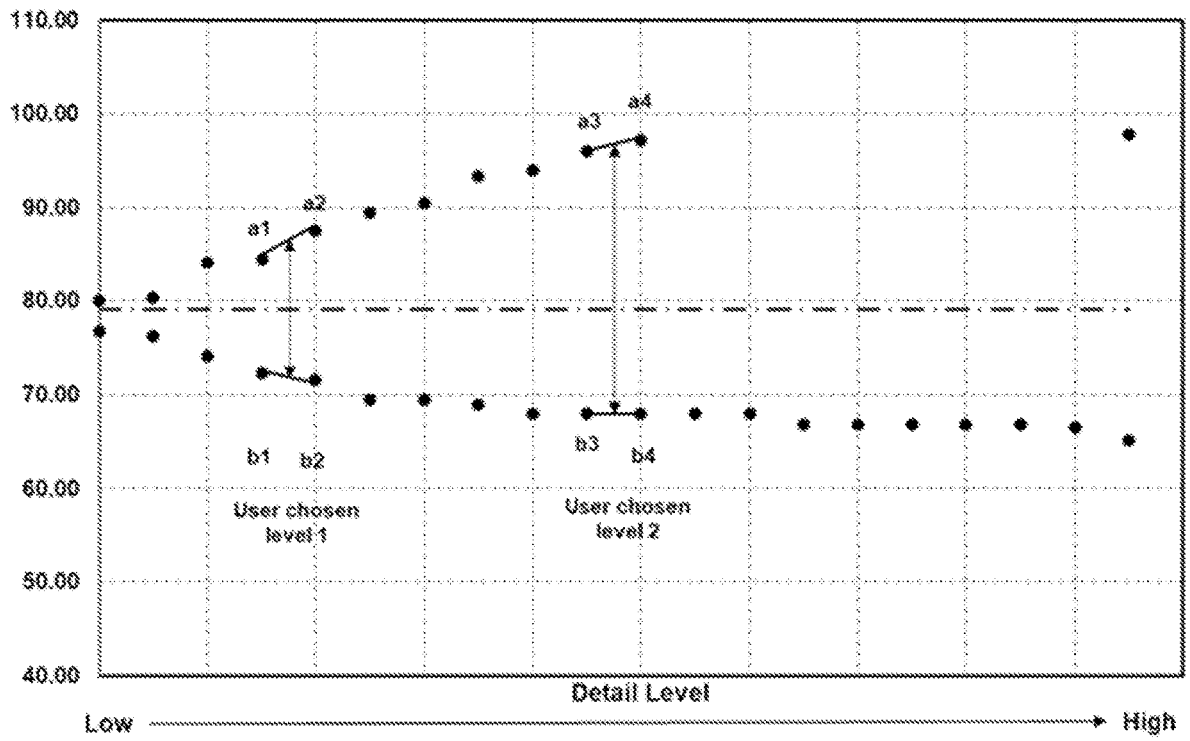
FIG. 7 is a graphical depiction of the data in Table 1 processed according to the method of FIG. 6.

With reference to FIG. 7, consider the same set of data provided earlier in Table 1 (without the outlier), if the user chosen level is 1 in the figure, the extrema (e.g., the upper and lower values of a vertical line representative of the data set at the selected level of detail) to be displayed will be calculated by performing a linear interpolation between real data points a1 and a2 and b1 and b2. The upper and lower points to be displayed, e.g., the local extrema, and any vertical representation therebetween, are vertically aligned points on the respective linear interpolations between a1 and a2, and b1 and b2, at the slider location. Similarly, when the selected level of detail is at level 2, the system calculates the extrema to be displayed by interpolating between points a3 and a4, and between b3 and b4, and then selecting respective upper and lower extrema along the interpolations consistent with the slider location.

Figure 8:
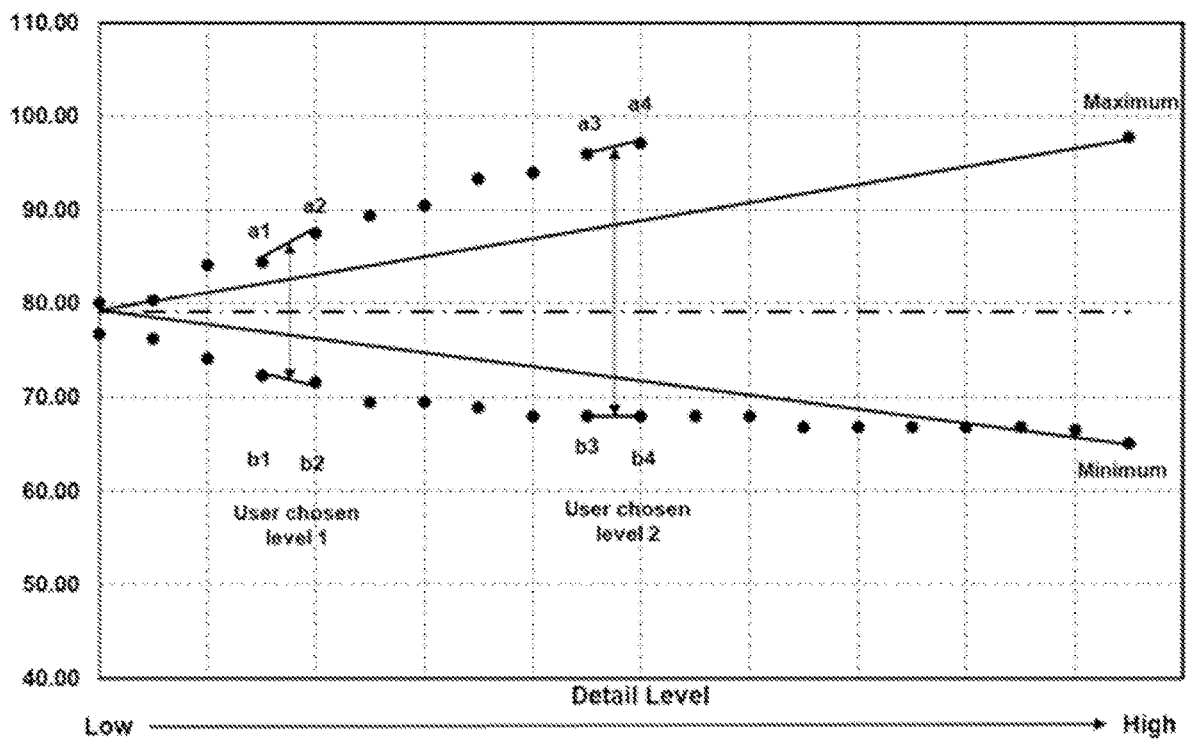
FIG. 8 is a graphical comparative depiction of data processed according to the method of FIG. 2 and the method of FIG. 6.

With reference to FIG. 8, a graph is shown that overlays a visual depiction of the first method (represented by solid linear interpolation lines between an average and the minimum and maximum extrema of the data set) with a visual depiction of the second method 2, represented by discrete data points along upper and lower non-linear interpolations for the same set of data used earlier (Table 1). Consider the detail level at user chosen level 1. The extrema values displayed using the first method will be around 82 and 78 whereas using the second method, the system displays a different representation of the data with values around 87 and 71. The same is true at the detail level of the user chosen level 2.

FIG. 6 illustrates a flowchart of the second method 600 for displaying data. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method includes identifying, with a processor, an average value of a set of data values at operation 610. According to some examples, the method includes segregating the set of data values into a first set of data values above the average value and a second set of data values below the average value at operation 620. The method further includes receiving an input for displaying a representation of the sequence of data values where the input defines a display level along a continuum between the average value and a combination of a minimum value and a maximum value at operation 630.

According to some examples, the method includes identifying, from the first set of data values, a first nearest value and a second nearest value associated with the input at operation 640. According to some examples, the method includes identifying, from the second set of data values, a third nearest value and a fourth nearest value associated with the input at operation 650. The method then includes generating a first data point based on a first linear interpolation between the first nearest value and the second nearest value at operation 260. The further includes generating a second data point based on a second linear interpolation between the third nearest value and the fourth nearest value at operation 670. In some examples, the first data point represents an average of the first linear interpolation and the second data point represents an average of the second linear interpolation. Alternatively, the data points may represent a mid-point between the ends of respective linear interpolation. The mid-point may be rounded to the nearest whole number.

The system further generates a display of at least one data point between the first data point and the second data point at operation 680. In some examples, the display of the at least one data point includes a vertical line drawn between the first data point and the second data point. In some examples, the at least one data point includes a first data point at the average of the first linear interpolation and a second data point at the average of the second linear interpolation.

Various aspects of the present disclosure differ from any prior art in that it provides more details when necessary and better workflow for faster display results/visualization without having to go to formula. The described methods offers\more flexibility and enable an accurate level of representation of data. The user gets to choose the level of detail he/she wants. Other visualization platforms do not offer this capability. This also differs from other filtering techniques that are typically used to deal with outliers in that they automatically filter out the outlier, but the proposed method acknowledges the outlier and gives the user the option to include it or not. The methods disclosed herein could be of use in any application relating to data trending where the number of sample points are greater than the actual sample points that can be represented in a single pixel. This is of greater importance when analyzing or visualizing equipment sensor data which is prone to variability in general.

Figure 9:
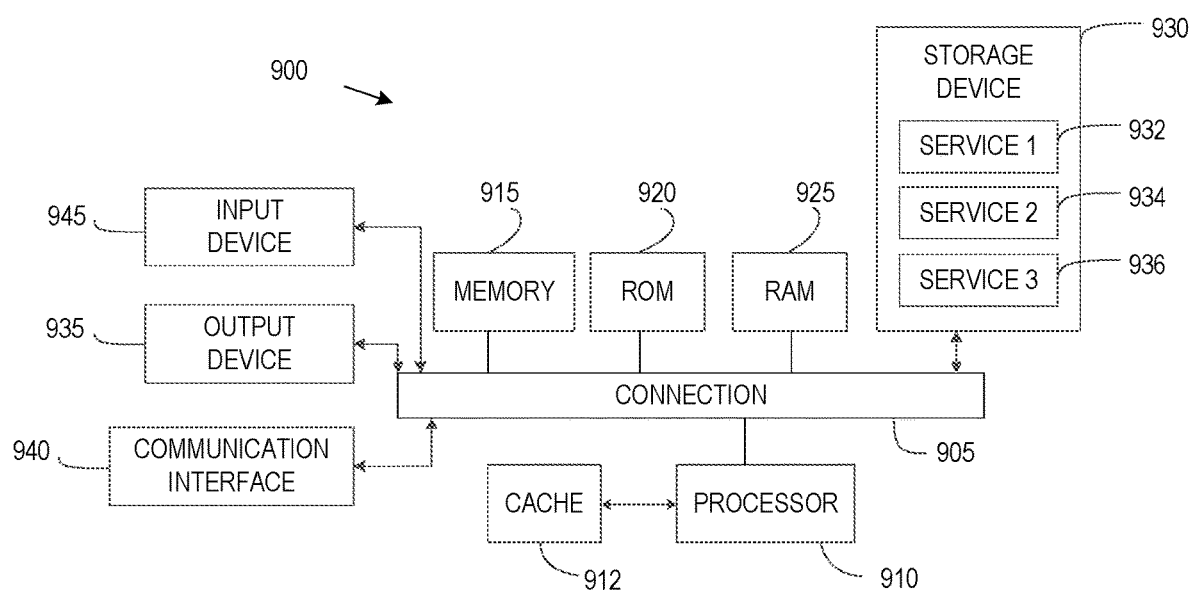
FIG. 9 shows an example of a system that may implement various aspects of the present technology and the various methods described herein.

FIG. 9 shows an example of computing system 900, which can be for example any computing device making up a system to implement the various methods disclosed herein or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be a display. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices. The storage device may store the time-series or other data processed herein, or such data may be stored in memory 915 or RAM 925.

The storage device 930 can include software services, servers, services, etc., that when the code that defines such software is executed by the processor 910, it causes the system to perform a function such as the various methods disclosed herein. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method of displaying time-series data comprising:
    identifying, with a processor, an average value of a set of data values of the time-series data, the set of data values corresponding to a subset of the time-series data and based on a number of pixels of a row of a display device available for displaying the time-series data;
    generating, with the processor, a first linear interpolation between the average value and a maximum value of the set of data values;
    generating, with the processor, a second linear interpolation between the average value and a minimum value of the set of data values; and
    displaying, with the processor and on the display device, a first point representative of a first location on the first linear interpolation and a second point representative of a second location on the second linear interpolation, the first and second points associated with a display level along a continuum between the average value and a combination of the minimum value and the maximum value, the first and second points both displayed in the same pixel column of the display device corresponding to a location on the row of pixels of the display device.

2. The method of claim 1 wherein: the first location and the second location are the same and thereby the at least one point is the average value when the input defines a display level at a first end of the continuum, and the first location is the maximum value and the second location is the minimum value thereby the at least one point includes a first point for the maximum value and a second point for the minimum value at a second end of the continuum.

3. The method of claim 1 further comprising displaying the first point vertically aligned with the second point in the pixel column associated with the pixel location on the row of the display device.

4. The method of claim 1 wherein the average value is a mean value, a median value, mode, weighted average value, or arithmetic average value.

5. The method of claim 1 further comprising receiving an input for displaying a representation of the sequence of data values, the input defining the display level along a continuum between the average value and a combination of the minimum value and the maximum value.

6. The method of claim 5 further comprising generating a slider bar presented in a graphical user interface, the slider bar defining the continuum between the average value and the combination of the minimum value and the maximum, and whereby a user interacts with the slider bar to set the display level along the continuum.

7. The method of claim 1 wherein the set of data values is a part of a larger set of data values, the larger set of data values being divided into a plurality of sets of data values, which include the set of data values, each of the plurality of sets of data values processed according to the method of claim 1.

8. A method of displaying time-series data comprising:
    identifying, with a processor, an average value of a set of data values of the time-series data, the set of data values corresponding to a subset of the time-series data and based on a number of pixels of a row of a display device available for displaying the time-series data;
    segregating the set of data values into a first set of data values above the average value and a second set of data values below the average value;
    receiving an input for displaying a representation of the sequence of data values, the input defining a display level along a continuum between the average value and a combination of a minimum value and a maximum value;
    identifying, from the first set of data values, a first nearest value and a second nearest value associated with the input;
    identifying, from the second set of data values, a third nearest value and a fourth nearest value associated with the input;
    generating a first data point based on a first linear interpolation between the first nearest value and the second nearest value;
    generating a second data point based on a second linear interpolation between the third nearest value and the fourth nearest value; and
    displaying, on the display device, a first point representative of the first data point and a first point representative of the second data point, the first point and the second points both displayed in the same pixel column of the display device corresponding to a location on the row of pixels of the display device.

9. The method of claim 8 wherein the first data point represents an average of the first linear interpolation and the second data point represents an average of the second linear interpolation.

10. The method of claim 9 wherein the at least one data point includes a first data point at the average of the first linear interpolation and a second data point at the average of the second linear interpolation.

11. The method of claim 10 wherein the display of the at least one data point includes a vertical line drawn between the first point and the second point in the pixel column associated with the pixel location on the row of the display device.

12. The method of claim 8 wherein the set of data values is a part of a larger set of data values, the larger set of data values being divided into a plurality of sets of data values, which include the set of data values, each of the plurality of sets of data values processed according to the method of claim 8.

13. A method of displaying time-series data comprising:

identifying, with a processor, an average value of a set of data values of the time-series data, the set of data values corresponding to a subset of the time-series data and based on a number of pixels of a row of a display device available for displaying the time-series data;

generating, with the processor, a first interpolation between the average value and a maximum value of the set of data values;

generating, with the processor, a second interpolation between the average value and a minimum value of the set of data values; and displaying, with the processor and on the display device, a first point representative of a first location on the first interpolation and a second point representative of a second location on the second interpolation, the first and second points associated with a display level along a continuum between the average value and a combination of the minimum value and the maximum value, the first and second points both displayed in the same pixel column of the display device corresponding to a location on the row of pixels of the display device.

14. The method of claim 13 wherein the first interpolation is first linear interpolation, and the second interpolation is a second linear interpolation.

15. The method of claim 14 wherein the display level is received by way of a slider bar presented in a graphical user interface, the slider bar defining the continuum between the average value and the combination of the minimum value and the maximum, and whereby a user interacts with the slider bar to set the display level along the continuum.

16. The method of claim 15 wherein generating the first interpolation and the second interpolation comprises:

segregating the set of data values into a first set of data values above the average value and a second set of data values below the average value;

receiving an input for displaying a representation of the sequence of data values, the input defining a display level along a continuum between the average value and a combination of a minimum value and a maximum value;

identifying, from the first set of data values, a first nearest value and a second nearest value associated with the input;

identifying, from the second set of data values, a third nearest value and a fourth nearest value associated with the input;

generating a first data point based on a first linear interpolation between the first nearest value and the second nearest value;

generating a second data point based on a second linear interpolation between the third nearest value and the fourth nearest value; and wherein displaying the first and second points comprises display of the first point between the first data point and the second data point.

17. The method of claim 13 wherein the display of the first and second points includes a vertical line drawn between the first point and the second point in the pixel column associated with the pixel location on the row of the display device.

18. The method of claim 13 wherein the set of data values is a part of a larger set of data values, the larger set of data values being divided into a plurality of sets of data values, which include the set of data values, each of the plurality of sets of data values processed according to the method of claim 13.

* * * * *